Feb. 19, 1929.

J. B. QUIGLEY 1,702,747

FLANGE COUPLING AND RADIAL BAIL

Filed Aug. 2, 1926      2 Sheets-Sheet 1

Inventor:
John Baird Quigley
By His Attorney.

Feb. 19, 1929.

J. B. QUIGLEY 1,702,747

FLANGE COUPLING AND RADIAL BAIL

Filed Aug. 2, 1926  2 Sheets-Sheet 2

Inventor:
John Baird Quigley
By
His Attorney.

UNITED STATES PATENT OFFICE.

JOHN BAIRD QUIGLEY, OF ST. LOUIS, MISSOURI.

FLANGE COUPLING AND RADIAL BAIL.

Application filed August 2, 1926. Serial No. 126,568.

The sliding flange coupling consists of a circular flange properly constructed and bolted to a divided flat ring (in two semi-circular parts) enclosing and in contact with the two sides and outer edge of a flange of lesser outside diameter permitting one flange to turn freely, while the other remains stationary; or both may turn in opposite directions.

The sliding flange coupling in combination with rods, pipes or cylinders will firmly hold the abutting ends in position; will permit one rod, shaft, pipe or cylinder to turn or revolve freely while the other remains stationary or permits both to revolve in opposite directions.

The sliding flange coupling in combination with housing containing suitable gear and pinion assembly and properly supported by horizontal shafts, which in turn are supported by pedestal bearings on a suitable bed plate for operating in mines, tunnels and quarries, may be used in combination with auger or drills and a part of the mechanism of portable boring or drilling machines. Such auger or drill may be operated at any point within the radius distance of the machine except at points within a small imaginary cylinder, the center line of which is the center line of the shafts which support the housing.

The radial rod bail is a device attached to that part of the housing containing the end of the driving shaft. The purpose of the rod and bail and associated parts is to hold that part of the housing to which it is attached in line with the driving shaft.

Other objects and advantages of the invention and combinations may appear from the accompanying drawings, the subjoined detailed description and the appended claim.

The accompanying drawings illustrate the invention.

In the drawings—

Figure 1 is a horizontal, and

Figure 2, a vertical longitudinal view of the sliding flange coupling and the radial rod bail in combination with a gear housing.

Figure 8:
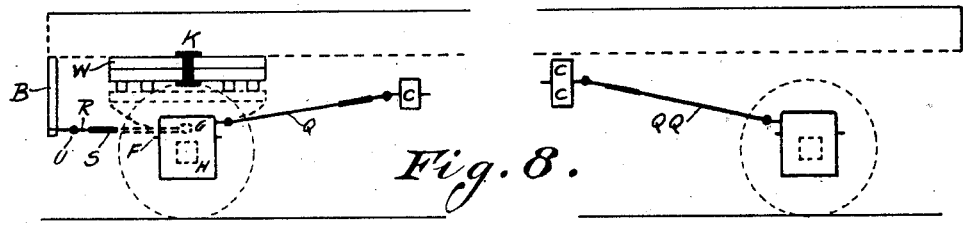

Figure 8, a longitudinal vertical section of the front end of an auto vehicle, showing the sliding flange coupling on the housing which contains the front axles, the differential, gears, pinions and end of the driving shaft which transmits power to the front wheels; the radial rod bail and associated parts, a fifth wheel of bearing and king pin.

Figure 1:
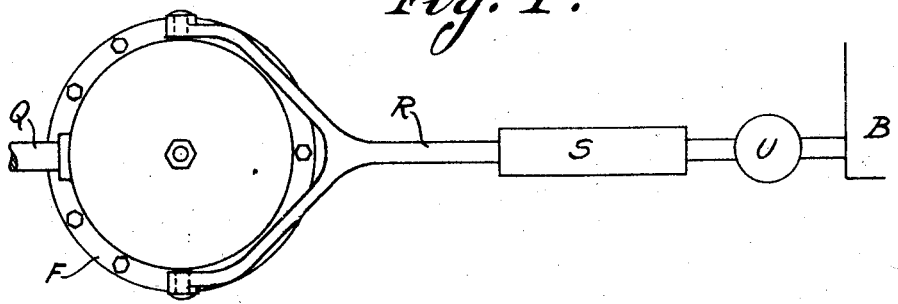

Figure 1 is a plan; and

Figure 2:
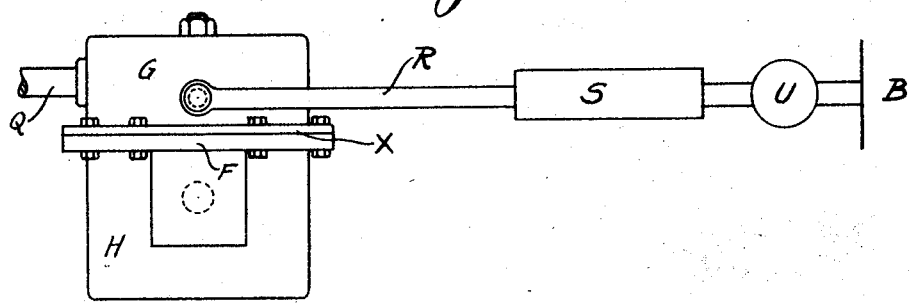

Figure 2 is a vertical longitudinal view of the sliding flange coupling F and the radial rod bail R in combination with the two members of a gear housing G and H.

Figure 3:
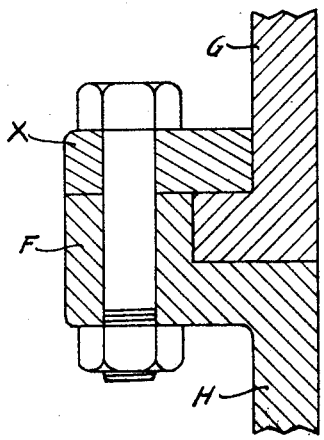
Figure 3 is a vertical section of the sliding flange coupling.

Figure 3 is a vertical section of the sliding flange coupling F, which is made up of the flange on G, and the flange on H bolted to the divided flat ring X, and permits free turning sliding movement of the flange on H, and the divided flat ring X on the flange on G. The flat ring X is in semi-circular parts for convenience in assembling and requires machine work only on such parts of the housing, ring and flanges as are in sliding contact.

The flanges may be attached to, cast with, or pressed on, the respective abutting ends of rods, pipes, shafts or cylinders.

The radial rod bail R consists of a horizontal rod, one end firmly and rigidly attached to the center of a horizontal semi-circular bail; the ends being pivotally attached to that part of the housing G containing the end of the driving shaft Q, which enters the housing in a plane parallel to the plane of the bail and the center in line perpendicular to a line through the center of the pivots on the ends of the bail. The other end of rod is provided with a slip joint S and ball and socket U (which compensate variations) attached to one end of a rigid vertical member B. The other end of the rigid member B is firmly and rigidly attached to the frame of the body, to which is attached the engine or motor that transmits power through the driving shaft Q.

The purpose of the radial rod bail is to hold that part of the housing G in line with the driving shaft Q while permitting free horizontal turning sliding movement of that part of the housing H, which may contain a car axle and gear or the ends of the front axle, the differential, and gear of an auto vehicle.

Figure 4:
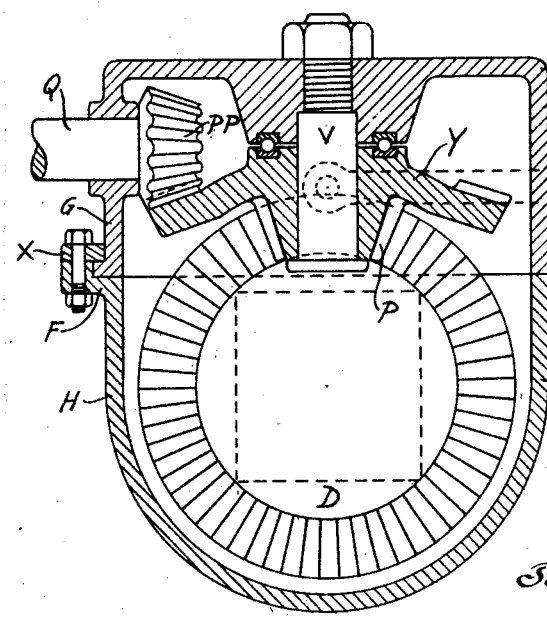
Figure 4 is a vertical longitudinal section of the sliding flange coupling in combination with a housing and showing an assembly of gears and pinions that will operate in combination with the sliding flange coupling and the end of the driving shaft.

Figure 4 is a vertical longitudinal section of a housing showing the sliding flange coupling F and containing a main gear D driven by a pinion P on a vertical shaft V; rotated by a horizontal gear Y driven by a pinion PP on the end of the driving shaft Q. An assembly suitable for operating and transmitting power in combination with the sliding flange coupling F.

All of the above, in combination with the housing containing an axle passing through and rigidly attached to the main gear D, is a suitable combination for the transmission of power to the wheels of an electric, steam or gas car or locomotive; having two trucks of four or more wheels each.

The front axles and differential in combination with the assembly of gears and pinions shown in Figure 4 enclosed in a housing with the sliding flange coupling F properly placed on and a part of the housing between the front axles and the end of the driving shaft Q is suitable for the transmission of power to the front wheels of auto vehicles.

Figure 5:
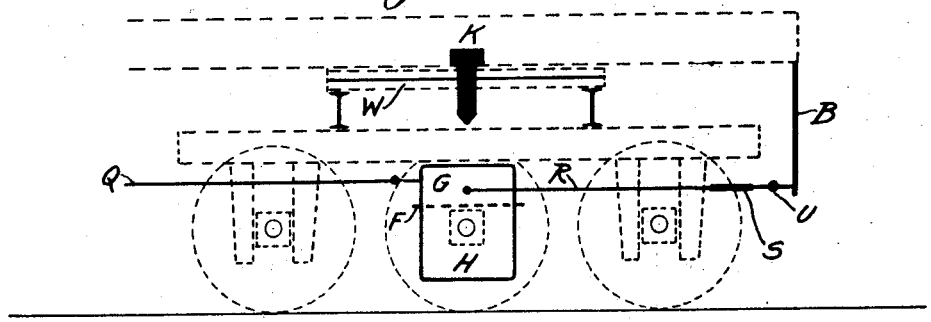
Figure 5 is a vertical longitudinal section of a part of the body and one truck.
Figure 6:
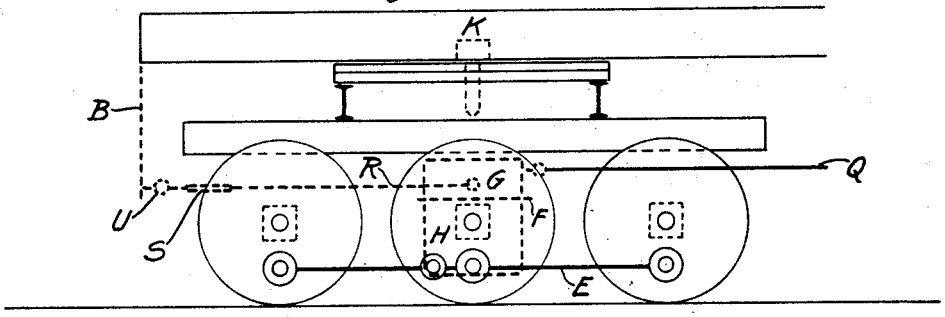
Figure 6 is a side view of the body and the other truck of an electric, steam or gas locomotive or car, having two trucks of six wheels each; one axle and gear housing on each truck equipped with the sliding flange coupling, the radial rod bail and a fifth wheel or bearing and king pin.

Figure 5 is a vertical longitudinal section of a part of the body and one truck;

Figure 6 is a side view of a part of the body and the other truck of an electric, steam or gas locomotive or car.

Both trucks are exactly the same, one turned end for end. The engine or motor and other parts not necessary for this description are omitted.

Figure 5 shows a truck with six tight wheels, one on each end of each axle, the middle axle with a tight gear D driven by pinion P on a vertical shaft V, rotated by a horizontal gear Y, driven by a pinion PP on the end of the driving shaft Q, encased in housing; all as shown and described in Figure 4.

The radial rod bail R, connected to the rigid member B (the upper end of which is firmly and rigidly attached to the body of the car or locomotive) permits free movement of the housing up and down while holding that part of the housing G in line with the body of the locomotive or car; while the sliding flange coupling F permits free, horizontal turning movement of that part of the housing H, which contains the axle and gear.

The upper member of the fifth wheel or bearing W is firmly attached to the body of the locomotive or car; the lower member of W is rigidly attached to the frame of the truck and the king pin K, permits free horizontal turning movement of the lower member of the fifth wheel or bearing W with the frame of the truck, turning on a vertical line through the center of the king pin K and the center of the middle axle as an axis. Power is transmitted by the wheels on the middle axle to the other wheels of the truck by the side rods E.

Any assembly of gears, pinions, worms or other devices that will operate in combination with the sliding flange coupling and radial rod bail may be used.

Figure 7:
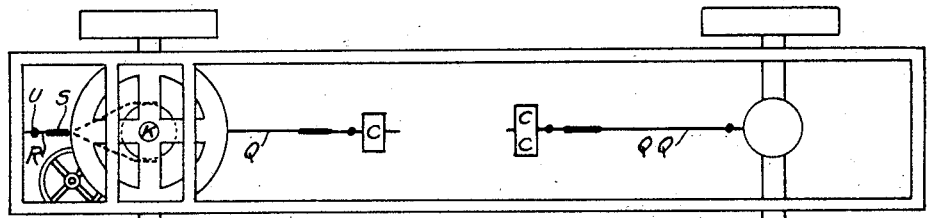
Figure 7 is a plan view.

Figure 7 is a plan; and

Figure 8, a vertical longitudinal section of an auto vehicle, in which power is transmitted equally to all the tread wheels. The engine, main clutch, rods, levers, brakes; rear axle, differential, gear, pinion, and housing are the same as in other like vehicles and together with other parts unnecessary for this description are omitted.

The front axles, differential, gears, pinion and end of the driving shaft which transmits power to the front wheels are enclosed in the housing.

The clutch CC controls power to the driving shaft QQ which transmits power to the rear wheels. Clutch C is on the driving shaft Q which transmits power to the front wheels.

The top member of the fifth wheel, or bearing W, is securely attached to the body of the vehicle; the bottom member rests on and is securely attached to a platform supported by springs which in turn rest on and are attached to the housing enclosing the front axles.

The king pin K is the axis on which turns the lower member of the fifth wheel or bearing W together with the springs, front wheels and that part of the housing H containing the front axles, the differential, and gear.

The sliding flange coupling F (shown in Figures 1, 2, 3, and 4) enables the radial rod bail R connected to the rigid vertical member B, the top of which is firmly and rigidly attached to the body of the vehicle, to hold that part of the housing G which contains the end of the driving shaft Q, pinions, and gear in line with the body of the vehicle and the driving shaft.

When all wheels are on a level, and the vehicle evenly loaded, a vertical straight line should pass through the center of the king pin K and through the center of the vertical shaft V, as shown in Figure 4.

When all wheels are not on a level or the vehicle not evenly loaded, the variations will be compensated by the ball and socket U, and the slip joint S (shown in Figures 1, 2, 5, 6, 7, and 8).

It is to be understood that the invention and combinations are not limited to the specific constructions herein illustrated and described, but can be embodied in other forms without departure from its spirit.

I claim:

A flanged coupling and radial bail rod of the class described, in combination with a differential power transmitting unit, comprising an outwardly flanged circular housing rotatably mounted upon the enclosing housing of said differential power transmitting unit, a horizontally disposed rotatable power transmitting shaft journalled in said flanged housing, a beveled pinion rigidly attached to said shaft and adapted to rotate in a vertical plane, a concavo-convex beveled pinion having cogs upon its upper face adapted to mesh with said first named pinion and rotate in a horizontal plane about a vertically disposed journal rigidly affixed in the center of said housing, a third beveled pinion integral with said second named pinion adapted to rotate in a horizontal plane and mesh with the ring gear of the said differential power transmitting unit, a radial bail rod forked at one end having the ends of the forks hingedly attached to said rotatable housing at diametrically opposite sides in line with the center of the axis of rotation of said concavo-convex pinion; said radial rod being divided and joined intermediate its ends by a slip joint, the outer end of the divided rod being joined to the frame of an auto vehicle by means of a ball and socket universal joint.

In witness whereof, I have hereunto set my hand this twenty-third day of November, 1927.

JOHN BAIRD QUIGLEY.